United States Patent

Inaba et al.

[19]

[11] Patent Number: 4,555,758
[45] Date of Patent: Nov. 26, 1985

[54] METHOD AND APPARATUS FOR CONTROLLING THE ACCELERATION AND DECELERATION OF A MOVABLE ELEMENT WITHOUT ABRUPT CHANGES IN MOTION

[75] Inventors: Hajimu Inaba, Hino; Shinsuke Sakakibara, Komae, both of Japan

[73] Assignee: Fanuc Ltd., Minamitsuru, Japan

[21] Appl. No.: 471,474

[22] Filed: Mar. 3, 1983

[30] Foreign Application Priority Data

Mar. 8, 1982 [JP] Japan ................................ 57-036184

[51] Int. Cl.⁴ ........................ G06F 15/46; G05B 19/18
[52] U.S. Cl. .................................... 364/174; 364/513; 901/20; 318/606
[58] Field of Search ............................... 364/172–174, 364/176, 180, 513; 318/594, 603, 606; 901/19–20, 23–24

[56] References Cited

U.S. PATENT DOCUMENTS

| 3,344,260 | 9/1967 | Lubens | 235/151.11 |
| 3,727,191 | 4/1973 | McGee | 340/172.5 |
| 3,969,615 | 7/1976 | Bowers et al. | 235/151.11 |
| 4,250,438 | 2/1981 | Onoda | 318/561 |
| 4,266,375 | 5/1981 | Nishimura et al. | 51/165.71 |
| 4,297,624 | 10/1981 | Komiya | 318/594 |
| 4,348,731 | 9/1982 | Kogawa | 364/513 |
| 4,353,019 | 10/1982 | Sweeney, Jr. | 318/594 |
| 4,374,351 | 2/1983 | Fishman et al. | 318/603 X |
| 4,401,930 | 8/1983 | Kato et al. | 318/603 |

FOREIGN PATENT DOCUMENTS 0024947 11/1981 European Pat. Off. .

*Primary Examiner*—Jerry Smith
*Assistant Examiner*—Gary V. Harkcom
*Attorney, Agent, or Firm*—Staas & Halsey

[57] ABSTRACT

A method and apparatus for controlling the acceleration of the frequency at the beginning of a pulse train and the frequency at the end of the pulse train, so that a movable element with little rigidity, such as a robot arm, can be started and stopped smoothly without vibration. The method includes storing frequency function in a memory, which frequency function represents an acceleration characteristic or a deceleration characteristic, reading the frequency function out of the memory at a predetermined interval, computing a frequency at the present time, and generating a number of pulses, corresponding to the product of the computed frequency and the predetermined time interval, during the predetermined time interval.

5 Claims, 6 Drawing Figures

METHOD AND APPARATUS FOR CONTROLLING THE ACCELERATION AND DECELERATION OF A MOVABLE ELEMENT WITHOUT ABRUPT CHANGES IN MOTION

BACKGROUND OF THE INVENTION

This invention relates to a method and apparatus for controlling acceleration and deceleration. More particularly, the invention relates to an acceleration-deceleration control method and apparatus well-suited for driving the movable element of a robot.

A numerical control device or robot control device may be adapted to control the table or tool of a machine tool or the movable element of a robot, such as a robot arm, to achieve positioning at desired points as well as movement along a desired path. The control device accomplishes this by performing an arithmetic pulse distribution operation based on a commanded amount of movement, thereby to produce so-called distributed pulses, and applying these pulses to a servo system to drive the servomotors of the machine tool or robot. In order to obtain good servomotor starting and stopping characteristics so that a servomotor may be started and stopped smoothly, it is common practice to provide the train of distributed pulses with an acceleration/deceleration characteristic. FIGS. 1 and 2 each show frequency characteristics wherein a train of distributed pulses is provided with an acceleration characteristic at the beginning of the pulse train and with a deceleration characteristic at the end of the pulse train. In FIG. 1 the acceleration/deceleration characteristic is linear, while in FIG. 2 the characteristic describes an exponential function.

The linear acceleration/deceleration characteristic is particularly effective for controlling a machine tool having a high degree of rigidity, wherein the movable element of the machine tool, such as a solid bed, reaches a constant speed in a short period of time. Owing to the abrupt change in the frequency of the distributed pulses at points P1, P2, P3, however, the movable element is likely to undergo vibration at these points. Such vibration poses problems when driving a movable element having little rigidity, such as the arm of a robot. It has therefore been proposed to use the acceleration/deceleration characteristic having the exponential function shown in FIG. 2 in order to eliminate the aforementioned vibration. With the latter characteristic, however, more time is required for positioning and vibration will still occur at point P4.

Thus the prior art exhibits disadvantages of the aforementioned kind and is not entirely satisfactory.

SUMMARY OF THE INVENTION

Accordingly, an object of the present invention is to provide a novel method and apparatus for controlling acceleration and deceleration, wherein a machine controlled by a numerical control device can be started and stopped smoothly in a short period of time.

Another object of the present invention is to provide a novel method and apparatus for controlling acceleration and deceleration, wherein a movable machine element having little rigidity, such as a robot arm, can be started and stopped smoothly in a short period of time without vibration.

According to the present invention, the foregoing and other objects are attained by providing a method and apparatus for accelerating and decelerating the frequency of a pulse train at the beginning and end of the pulse train. The method includes storing a frequency function in a memory in advance, which frequency function represents an acceleration characteristic or deceleration characteristic, reading the frequency function out of the memory at a predetermined interval, computing a frequency at the present time, and generating pulses, of a number corresponding to the product of the computed frequency and the predetermined time interval, during the predetermined time interval.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
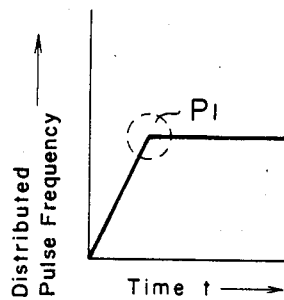
FIG. 1 shows a conventional acceleration/deceleration characteristic of linear type for a case where a train of distributed pulses is provided with an acceleration characteristic at the start of the pulse train and with a deceleration characteristic at the end of the pulse train.
Figure 2:
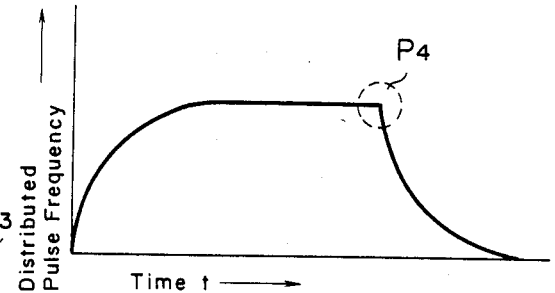
FIG. 2 shows another conventional acceleration/deceleration celeration characteristic, of exponential type, for a case where a train of distributed pulses is provided with an acceleration characteristic at the start of the pulse train and with a deceleration characteristic at the end of the pulse train.
Figure 3:
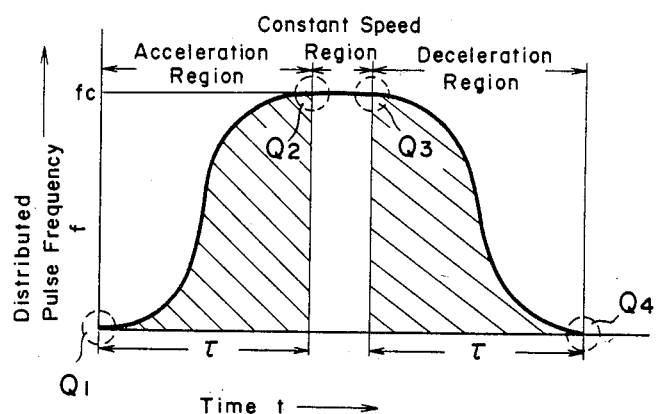
FIGS. 3, 4 and 5 show frequency characteristics of a train of distributed pulses and are useful in describing a method of controlling acceleration and deceleration according to the present invention.

According to the present invention, an arrangement is adopted wherein both an acceleration characteristic and deceleration characteristic vary as either a sinusoidal function or cubic function, and wherein the frequency f of a train of distributed pulses does not change abruptly at points Q1, Q2, Q3 and Q4 shown in FIG. 3. The invention achieves the foregoing by storing beforehand, in a read-only memory (ROM) or like memory, a frequency function g(t) indicative of either an acceleration or deceleration characteristic, reading the frequency function g(t) out of the memory at a predetermined time interval $\Delta t$ to obtain the frequency $f(t_i)$ of the pulse train at the present time $t_i$, and generating pulses of a number corresponding to the product of $f(t_i)$ and $\Delta t$ for the length of time $\Delta t$.

Figure 5:
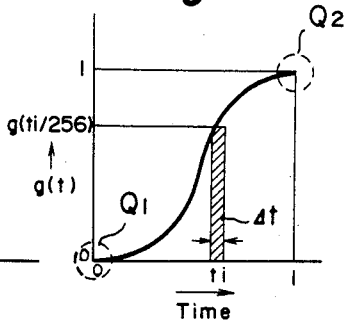

FIG. 5 depicts the aforementioned frequency function g(t), which is given by the following:

$$g(t) = \tfrac{1}{2} \sin [\pi(t - \tfrac{1}{2})] + \tfrac{1}{2} \qquad (1)$$

It should be noted that the frequency function g(t) and time t exhibit a maximum value of one when normalized. If we assume a time constant of, say, 256 milliseconds (which will have a value of one when normalized), then the prevailing value of $g(t_i/256)$ (where i=1, 2, . . . , 32) will be stored successively at the first to 32nd addresses of a ROM every 8 milliseconds. Thus, starting from a reference time, the value of the frequency function prevailing at time $t_1$ (=8 milliseconds) will be stored at the first address, the value prevailing at time $t_2$ (=16 milliseconds) will be stored at the second address, the value prevailing at time $t_{31}$ (=248 milliseconds) will be stored in the 31st address, and the value prevailing at $t_{32}$ (=256 milliseconds) will be stored at the 32nd address. If we let $f_c$ be the commanded frequency, then the frequency $f(t_i)$ of the distributed pulse train will be the product of $f_c$ and $g(t_i/256)$. Accordingly, as will be apparent from FIG. 5 and from Eq. (1), the differential coefficients $g'(0)$, $g'(1)$ at points Q1, Q2 both become zero, meaning that the frequency $f(t_i)$ of the distributed pulse train will not change abruptly at these points.

According to a feature of the present invention, acceleration and deceleration are controlled in accordance with the frequency characteristic of FIG. 3 when the following relation holds:

$$L \geq f_c \cdot \tau \quad (2)$$

Figure 4:
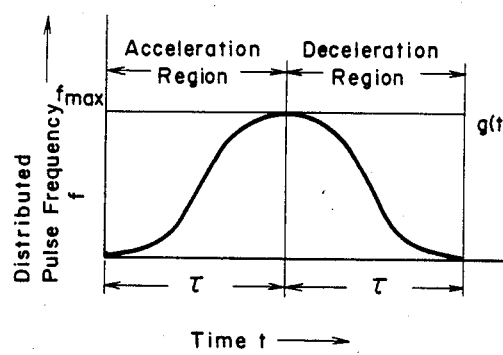

(where $f_c$ represents the commanded frequency, L represents a commanded amount of movement, and $\tau$ represents the time constant), and in accordance with the frequency characteristic of FIG. 4 when the following relation holds:

$$L < f_c \cdot \tau \quad (3)$$

(where $f_c$, L and $\tau$ are as defined above). Note that $f_c \cdot \tau$ is the sum of the acceleration distance and deceleration distance, shown by the shaded portion of FIG. 3. Further, according to the invention, maximum frequency $f_{max}$ shown in FIG. 4 is decided so as to satisfy the relation:

$$L = f_{max} \cdot \tau \quad (3)$$

In other words, $f_{max}$ is computed from:

$$f_{max} = L/\tau \quad (4)$$

Figure 6:
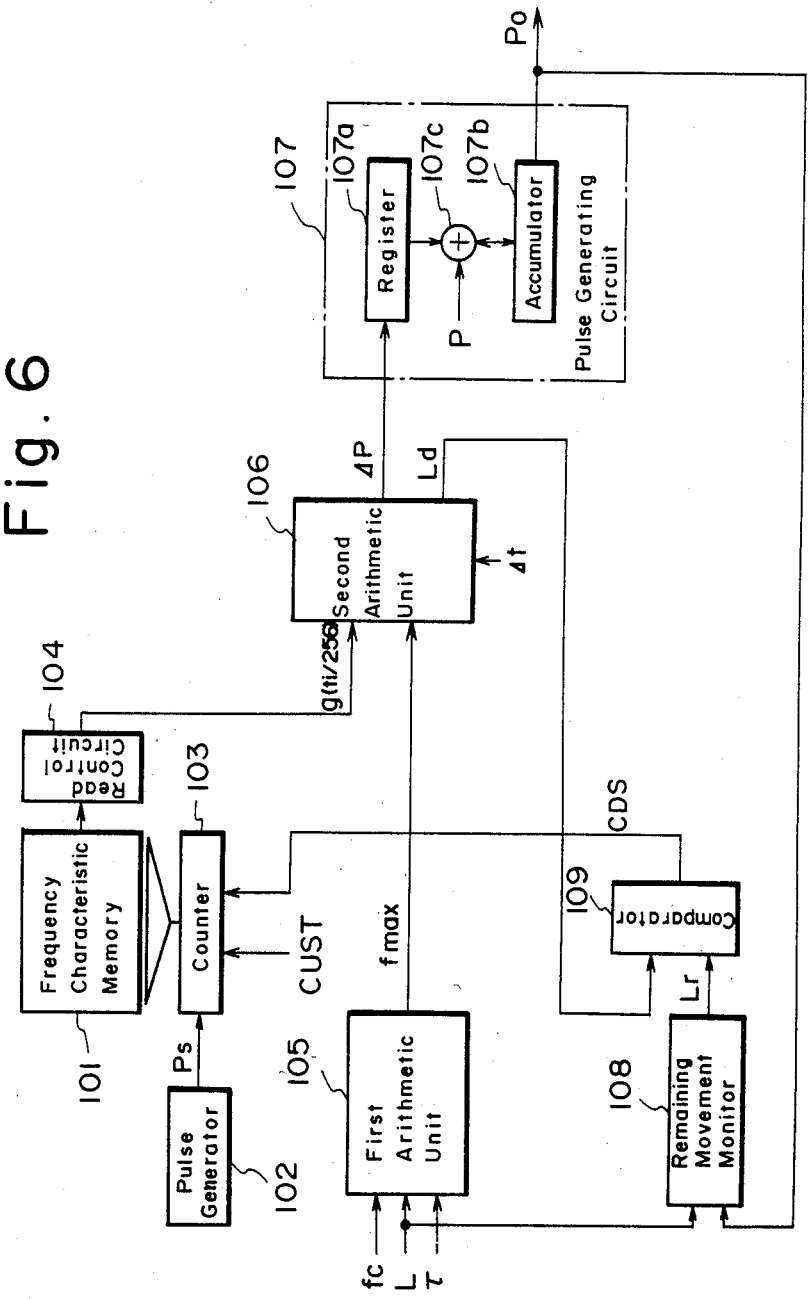
FIG. 6 is a block diagram of an embodiment of an acceleration/deceleration control apparatus according to the present invention.

Reference will now be had to FIG. 6 showing a block diagram of an apparatus for practicing the method of the present invention. The apparatus includes a memory 101 for storing frequency characteristics. If the time constant is 256 milliseconds as described above, then the memory 101 will be capable of storing the value of the frequency function $g(t_i/256)$ (i=1, 2, ..., 32) prevailing at each of 32 points in a time series $t_1, t_2, \ldots, t_{32}$, which points occur every 8 milliseconds. Further included is a pulse generator 102 for generating pulses Ps having a period of 8 milliseconds. The pulses Ps enter a counter 103 the status whereof is incremented by the pulses Ps during acceleration (left side of FIGS. 3 and 4), the counted value being maintained constant when the speed is constant (central portion of FIG. 3), and the status of the counter is decremented by the pulses Ps during deceleration (right side of FIGS. 3 and 4). The value of the count prevailing within the counter 103 designates an address in memory 101, from which address the value of the frequency function g(t) will be read. This is performed by a read control circuit 104 which is adapted to read $g(t_i/256)$ out of the memory 101 at a regular interval $\Delta t$, i.e., every 8 milliseconds in the illustrated embodiment. A first arithmetic unit 105, the inputs to which are signals indicative of the commanded frequency $f_c$, commanded amount of movement L and time constant $\tau$, is operable to compare the magnitudes of L and the product $f_c \cdot \tau$, and to produce an output signal indicative of $f_c$, which will serve as the maximum frequency $f_{max}$, when the relation $L \geq f_c \cdot \tau$ is found to hold, and indicative of $L/\tau$ [expressed by Eq. (4)] which will serve as $f_{max}$ when the relation $L \leq f_c \cdot \tau$ is found to hold. The signal indicative of $f_{max}$ is applied to a second arithmetic unit 106 for performing the following arithmetic operations:

$$\Delta p = f_{max} g(t_i/256) \Delta t \quad (5)$$

$$L_d = f_{max} \cdot \tau/2 \quad (6)$$

In Eq. (5), the product $f_{max} g(t_i/256)$ is the frequency $f(t_i)$ at the present time $t_i$. Therefore, $\Delta p$ represents the number of pulses generated during the interval $\Delta t$, which is equal to 8 milliseconds in this embodiment. In Eq. (6), Ld represents the amount of movement which remains for starting deceleration. The second arithmetic unit 106 applies a signal indicative of $\Delta p$ to a pulse generating circuit 107 having the well-known construction of a digital differential analyzer (DDA). Specifically, the pulse generating circuit 107 comprises a register 107a in which the value $\Delta p$ is set, an accumulator 107b, and an adder 107. The latter adds the contents of register 107a and the contents of the accumulator 107b together each time a pulse P is generated, these pulses being generated at a constant frequency Fo, and stores the resulting sum in the accumulator 107b. Owing to the input from the adder 107c, the accumulator 107b produces overflow pulses as the output pulses Po of the pulse generating circuit 107. If the accumulator 107b has an n-bit construction, then the pulse rate $f_o$ of the output pulses Po will be expressed by:

$$f_o = \Delta p \cdot F_o / 2^n \quad (7)$$

Therefore, letting the frequency of the pulses P be given by:

$$F_o = 125 \cdot 2^n \text{ (pulse/sec)} \quad (8)$$

the following will hold:

$$f_o = 125 \cdot \Delta p \text{ (pulse/sec)} \quad (7')$$

and $f_o \cdot 8/1000$ pulses, namely $\Delta p$-number of output pulses Po, will be generated during $\Delta t$ (=8 milliseconds).

The apparatus also includes a unit 108 for monitoring the remaining amount of movement. The monitoring unit 108 receives the commanded amount of movement L as one input thereto and is set to this value, and receives the output pulses Po from the pulse generating circuit 107 as the other input thereto, the set value L being decremented by one count each time one of the pulses Po is generated. The value remaining in the monitoring unit 108 represents the remaining amount of movement (namely the distance remaining to be traveled by the movable element), a signal Lr indicative of this value being delivered to a comparator circuit 109. The latter compares the magnitude of Lr with the magnitude of the remaining amount of movement Ld for starting deceleration, received from the second arithmetic unit 106, and produces a count-down start signal CDS, connected to the counter 103, when Ld and Lr are found to be equal. Also applied to the counter 103 is a count-up stop signal CUST which, following the start of acceleration, is generated upon passage of a time period corresponding to the time constant $\tau$. The signal CUST terminates the counting operation performed by the counter 103.

In the operation of the apparatus shown in FIG. 6, the commanded amount of movement L and the commanded frequency $f_c$ are read in from a numerical control tape. The signals indicative of L and $f_c$ enter the first arithmetic unit 105, and L is also applied to the monitoring unit 108 and set therein. At the same time, the counter 103 begins counting up the pulses Ps having the period $\Delta t$ (=8 milliseconds). The first arithmetic unit 105 compares L and the product $f_c \cdot \tau$ in magnitude and produces $f_c$ as the maximum frequency $f_{max}$ when $L \geq f_c \cdot \tau$ holds, or $L/\tau$ as the maximum frequency $f_{max}$ when $L < f_c \cdot \tau$ holds. In concurrence with the foregoing, counter 103 counts up the pulses Ps and, when the counter is incremented to a numerical value of 1, the read control circuit 104 reads the normalized frequency function $g(t_1/256)$ out of the first address of the frequency storage memory 101 at time $t_1$ (where $t_1=8$). The value read out of the memory 101 is applied to the second arithmetic unit 106. The latter performs the arithmetic operations of Eqs. (5) and (6) to supply the pulse generating circuit 107 with the number of pulses $\Delta p$ generated during the time $\Delta t$ and to provide the comparator 109 with the remaining amount of movement Ld for starting deceleration. The pulse generating circuit 107 performs the DDA pulse generating operation described above to generate the $\Delta p$-number of output pulses Po during the time $\Delta t$. Each pulse Po is applied to the monitoring unit 108 as the pulse is generated, whereby the content of the monitoring unit is decremented by one count as each pulse Po arrives. The comparator circuit 109 is operable to compare Lr and Ld in magnitude at all times.

The pulse generating circuit 107 generates $\Delta p$-number of output pulses Po before the passage of time $\Delta t$ (=8 milliseconds). When the second pulse Ps is generated by the pulse generator 102, the content of counter 103 is incremented to a value of 2 and the value of the frequency function $g(t_2/256)$ (where $t_2=16$) is read out of the second address of the memory 101. This value is applied to the second arithmetic unit 106. This is followed by the series of operations described above. The foregoing processing is repeated at each of the points in the time series t3, t4, . . . , t32 spaced apart by $\Delta t$ (=8 milliseconds).

The frequency (pulse rate) of the output pulses Po is accelerated in accordance with the acceleration characteristic of FIG. 3 in a case where $L \geq f_c \cdot \tau$ holds, and in accordance with the acceleration characteristic of FIG. 4 in a case where $L < f_c \cdot \tau$ holds, with $f_c$ or $f_{max}$ being attained upon passage of the time constant $\tau$. The count-up stop signal CUST is generated after the elapse of the time constant $\tau$. If the relation $L \geq f_c \cdot \tau$ holds at this time, the content of the counter 103 will be maintained at a value of 32 so that the input to the second arithmetic unit 106 will stay at $g(1)$ (=1) from then on. When a length of time equivalent to the time constant $\tau$ elapses in a case where $L < f_c \cdot \tau$ holds, the relation Lr=Ld will hold. The comparator circuit 109 will therefore produce the count-down start signal CDS to start deceleration processing from that point in time onward.

When the relation $L \geq f_c \cdot \tau$ holds, the second arithmetic unit 106 performs the operation:

$$\Delta p = f_{max} \cdot g(1) \cdot \Delta t$$

-continued
$$= f_c \cdot \Delta t$$

every 8 milliseconds ($\Delta t$), and supplies the pulse generating circuit 107 with the number of pulses $\Delta p$ generated during the time period $\Delta t$. The pulse generating circuit 107 generates $\Delta p$-number of output pulses Po during the time period $\Delta t$ and holds the frequency at a constant value. The output pulses Po enter the monitoring unit 108 which responds by counting down the remaining amount of movement Lr one step at a time. As the foregoing processing is repeated in like fashion, Lr=Ld will be established at a certain point in time and the comparator circuit 109 will generate the count-down start signal CDS. The counter 103 responds to this signal by allowing its content to be counted down by one step every time a pulse Ps is generated. The read control circuit 104 consequently reads $g(248/256)$, $g(240/256)$, . . . , $g(16/256)$, $g(8/256)$ out of the memory 101 in successive fashion every 8 milliseconds ($\Delta t$), whereby the number of pulses $\Delta p$ generated during the length of time $\Delta t$ are diminished in accordance with the curve indicating the deceleration characteristic of FIG. 3. In other words, the frequency is reduced in accordance with the deceleration characteristic shown in FIG. 3.

If the output pulses Po obtained through the above-described processing are applied to the pulse distribution circuit of a numerical control device or robot control device and a pulse distribution operation is executed each time an output pulse Po is produced, then the pulse train provided by the pulse distribution circuit will have the acceleration/deceleration characteristic depicted in FIG. 3 or in FIG. 4.

It will be understood from the foregoing description that the change in output frequency is not abrupt. This will enable even a movable element having little rigidity to be started and stopped smoothly and in a short period of time.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling, in an apparatus including a memory, an access means and a computing means, acceleration of the frequency at the beginning of a pulse train and the deceleration of the frequency at the end of the pulse train, comprising the steps of:

storing a frequency function in a memory in advance, which frequency function represents an acceleration characteristic having minimum initial acceleration during an acceleration period and deceleration characteristic having minimum initial deceleration during a deceleration period;

reading the frequency function out of the memory via the access means at predetermined time intervals, which frequency function represents the acceleration characteristic during acceleration and the deceleration characteristic during deceleration;

receiving a command frequency;

computing using the computing means, a frequency of the pulse train from the product of the command frequency and the frequency at specified times during acceleration and during deceleration; and generating the pulse train having a number of pulses corresponding to the product of the computed frequency and the predetermined time interval, during said predetermined time interval.

2. The method according to claim 1, in which said frequency function is a cubic function.

3. The method according to claim 1, in which said frequency function is a sinusoidal function.

4. An apparatus for controlling acceleration and deceleration having means for accelerating the frequency of a pulse train at the beginning thereof and means for decelerating the frequency of the pulse train at the end thereof, comprising:

a memory for storing a preset frequency function g(t) prevailing at each point in a time series;

a pulse generator for generating pulses having a preset period;

a counter for counting up said pulses during acceleration, holding the resulting counted value constant during constant speed and counting down said counted value during deceleration each time one of said pulses is generated, said counted value designating an address of said memory;

a read control circuit for reading the frequency function g(t) out of said memory from an address thereof designated by the counted value in said counter;

a first arithmetic unit having inputs of a commanded frequency $f_c$, a commanded amount of movement L and a time constant $\tau$, for comparing the magnitudes of the commanded amount of movement L and the product of the commanded frequency $f_c$ and time constant $\tau$ ($f_c \cdot \tau$) to produce the commanded frequency $f_c$ as an output indicative of maximum frequency $f_{max}$ when $L \geq f_c \cdot \tau$, and to produce $L/\tau$ as an output indicative of maximum frequency $f_{max}$ when $L < f_c \cdot \tau$;

a second arithmetic unit for computing a number of pulses $\Delta P$ generated during a predetermined time interval $\Delta t$ by finding the product of a frequency $f(t_i)$ prevailing at a present time $t_i$ where i=1, 2, 3, ... ,and the time interval $\Delta t$, where $f(t_i) = f_{max} \cdot g(t_i/256)$, and for computing an amount of remaining movement Ld for starting deceleration, where $Ld = f_{max} \cdot \tau / 2$;

a pulse generating circuit comprising a digital differential analyzer which receives the pulses $\Delta P$ as an input thereto for generating output pulses Po;

a remaining amount of movement monitoring unit, in which the commanded amount of movement L is set, for producing a remaining amount of movement Lr by counting down the set value of L by one step each time one of said output pulses Po is generated; and a comparator circuit which compares the magnitude of the remaining amount of movement Ld and of the remaining amount of movement Lr for delivering a signal to said counter when Ld=Lr, said counter responding to said signal by counting down said counted value.

5. The apparatus according to claim 4, in which pulse generating circuit comprises:

a register in which said number of pulses $\Delta P$ is set;

an accumulator for performing an arithmetic operation; and an adder for adding together the content of said register and the content of said accumulator each time a pulse P is generated at a constant period Fo and for storing the resulting sum in said accumulator, said accumulator delivering overflow pulses as said output pulses Po.

* * * * *

UNITED STATES PATENT AND TRADEMARK OFFICE
CERTIFICATE OF CORRECTION

PATENT NO. : 4,555,758            Page 1 of 2

DATED : November 26, 1985

INVENTOR(S) : Inaba et al.

It is certified that error appears in the above-identified patent and that said Letters Patent is hereby corrected as shown below:

Column 2, line 24, delete "celeration" (second occurrence);
          line 44, "f" should be --$\underline{f}$--;
          line 61, "t" should be --$\underline{t}$--.

Column 3, line 21, "τ" should be --$\underline{\tau}$--;
          line 27, "τ" should be --$\underline{\tau}$--;
          line 66, "τ" should be --$\underline{\tau}$--.

Column 4, line 68, "τ" should be --$\underline{\tau}$--.

Column 5, line 53, "τ" should be --$\underline{\tau}$--;
          line 55, "τ" should be --$\underline{\tau}$--;
          line 59, "τ" should be --$\underline{\tau}$--.

Column 6, line 65, after "frequency" (second occurrence) insert --function--.

Column 7, line 28, "τ" should be --$\underline{\tau}$--;
          line 31, "τ" should be --$\underline{\tau}$--.

UNITED STATES PATENT AND TRADEMARK OFFICE
CERTIFICATE OF CORRECTION

PATENT NO. : 4,555,758

DATED : November 26, 1985

INVENTOR(S) : Inaba et al.

It is certified that error appears in the above-identified patent and that said Letters Patent is hereby corrected as shown below:

Column 8, line 4, delete "where i = 1,2,3,";
         line 5, delete "...,";
         line 8, "2;" should be --2, where i = 1,2,3,...;--.

Signed and Sealed this

Eighth Day of April 1986

[SEAL]

Attest:

DONALD J. QUIGG

Attesting Officer     Commissioner of Patents and Trademarks